United States Patent
Ouellette et al.

(10) Patent No.: US 7,377,037 B2
(45) Date of Patent: May 27, 2008

(54) FILLET MACHINING METHOD WITHOUT ADAPTIVE PROBING

(75) Inventors: Randall Maurice Ouellette, Proctor, VT (US); Jeffrey Robert Close, Fair Haven, VT (US); James Henry Madge, Erie, PA (US)

(73) Assignee: General Electric Company, Schenectady, NY (US)

( * ) Notice: Subject to any disclaimer, the term of this patent is extended or adjusted under 35 U.S.C. 154(b) by 532 days.

(21) Appl. No.: 10/852,828

(22) Filed: May 25, 2004

(65) Prior Publication Data

US 2005/0274011 A1    Dec. 15, 2005

(51) Int. Cl.
*B23P 15/04* (2006.01)

(52) U.S. Cl. ............... 29/889.23; 29/889.7; 29/557; 409/95; 700/117; 700/159; 700/160

(58) Field of Classification Search ............... 29/889.7, 29/557, 889, 889.23; 409/95, 120; 700/95, 700/117, 159, 160, 161
See application file for complete search history.

(56) References Cited

U.S. PATENT DOCUMENTS

| 2,178,441 | A | * | 10/1939 | Swanson | ............... | 409/171 |
|---|---|---|---|---|---|---|
| 5,091,861 | A | * | 2/1992 | Geller et al. | ............... | 700/192 |
| 5,288,209 | A | | 2/1994 | Therrien et al. | | |
| 6,340,424 | B1 | * | 1/2002 | Elman et al. | ............... | 205/645 |
| 6,491,482 | B1 | * | 12/2002 | Fenkl et al. | ............... | 409/132 |
| 6,560,890 | B1 | | 5/2003 | Madge et al. | | |
| 6,641,340 | B1 | * | 11/2003 | Hajjar et al. | ............... | 409/94 |
| 6,905,312 | B2 | * | 6/2005 | Bourgy et al. | ............... | 416/234 |
| 2004/0055710 | A1 | | 3/2004 | Byrnes et al. | | |
| 2004/0143362 | A1 | * | 7/2004 | Matthews et al. | ............... | 700/182 |
| 2005/0268461 | A1 | * | 12/2005 | Ouellette et al. | ............... | 29/889.7 |

* cited by examiner

*Primary Examiner*—Jermie Cozart
(74) *Attorney, Agent, or Firm*—William Scott Andes, Esq.; Armstrong Teasdale LLP

(57) ABSTRACT

A method for finishing a part having excess material includes generating one or more surfaces on a model of the part to be machined, creating a machining tool path drive geometry, using the machine tool path drive geometry and one or more surfaces on the model to be machined to generate machining tool paths on the surfaces; and running tool paths on the part in a fixture.

16 Claims, 4 Drawing Sheets

FILLET MACHINING METHOD WITHOUT ADAPTIVE PROBING

BACKGROUND OF THE INVENTION

This invention relates generally to machining of surfaces and to part having machined surfaces, and more particularly, to methods and computer-aided machining of surfaces without the requirement of adaptive probing and to parts produced thereby.

Forging processes used to create some surfaces, for example, airfoil and platform surfaces, can leave excess material at intersections of edges. For example the forging process used to create airfoil and platform surfaces leaves extra material at an intersection between the airfoil lead edge (LE, or thick edge), trail edge (TE, or thin edge) and the platform. In at least one known production operation, a manual process is used to remove this excess material. In this process, referred to as "benching" or "bench blend," a highly skilled operator grinds away material using a rotating abrasive wheel. The operator must be dedicated to the task and cannot complete any other tasks while conducting the benching operation. The operator must be highly skilled because of the proximity of the operator's hands to the grinding wheel and the high volume of parts handled in production operations. Furthermore, the blending operation must produce a smooth transition between the root fillet, airfoil and platform surfaces. No undercuts of the airfoil or platform surface are permitted since this will create stress concentrations.

Besides manual bench blending, another known technique for removing the excess material utilizes a milling machine. The region around the root fillet is probed with a Renishaw-type probe and the geometric data thus obtained is used to adjust a computer numerical control (CNC) program to adapt to the airfoil and platform surfaces. Such probes are available from Renishaw PLC, New Mills, Wooton-Under-Edge, Gloucestershire, U.K. This technique usually requires a second control unit to make essential calculations and to modify the CNC program. For high volume, short cycle time parts, the extra time required has an adverse effect on productivity.

Another known technique for removing the excess material is profile milling. Profile milling uses a ball nose end mill of the same radius as the desired fillet to generate the correct geometry. A single curve is described as the drive geometry, and the CNC program drives the end mill along this path. However, a drawback of this technique is that the end mill can be fully engaged (i.e., the entire radius of the ball is cutting), which usually increases the chance of machining chatter.

BRIEF DESCRIPTION OF THE INVENTION

There is therefore provided, in some aspects of the present invention, a method for finishing a part having excess material. The method includes generating one or more surfaces on a model of the part to be machined, creating a machining tool path drive geometry, using the machine tool path drive geometry and one or more surfaces on the model to be machined to generate machining tool paths on the surfaces; and running tool paths on the part in a fixture.

In other aspects, the present invention provides a method for finishing a part having excess material. The method includes generating one or more surfaces on a model of the part to be machined, creating a machining tool path drive geometry, using the machine tool path drive geometry and the one or more surfaces on the model to be machined to create a computer numerical control path for a machining tool on the surfaces, and running tool paths on the part in a fixture.

In still other aspects, the present invention provides a forged part having airfoil and platform surfaces. The forged part is finished by a method that includes generating one or more surfaces on a model of the part, creating a machining tool path drive geometry, using the machine tool path drive geometry and the one or more surfaces on the model to create a computer numerical control path for a machining tool on the surfaces, and running tool paths on the part in a fixture.

Configurations of the present invention provide flexibility in the shape of a machined surface. This, in turn, facilitates a more continuous mating with, for example, an air foil and platform. In general, a true arc is not required at the LE and TE platform fillet. In various configurations, an improved surface finish is achieved.

DETAILED DESCRIPTION OF THE INVENTION

As a technical effect of the present invention, flexibility in the shape of a machined surface is provided. Other technical effects include facilitating a more continuous mating with, for example, an air foil and platform. In various configurations, another technical effect of the present invention is that an improved surface finish is achieved.

In some configurations of the present invention, a single point milling technique is provided that uses a smaller ball end mill than is used in root fillet milling. The drive geometry is a surface instead of a curve, and the final shape of the machined surface is controlled by the shape and location of the drive surface rather than the radius of the end mill. These configurations of the present invention provide flexibility in the shape of the machined surface, which in turn facilitates a more continuous mating with the air foil and platform. In general, a true arc is not required at the LE and TE platform fillet. The end mill also has a smaller percentage of its periphery cutting at any one time than is the case with root fillet milling, thereby providing an improved surface finish.

Figure 1:
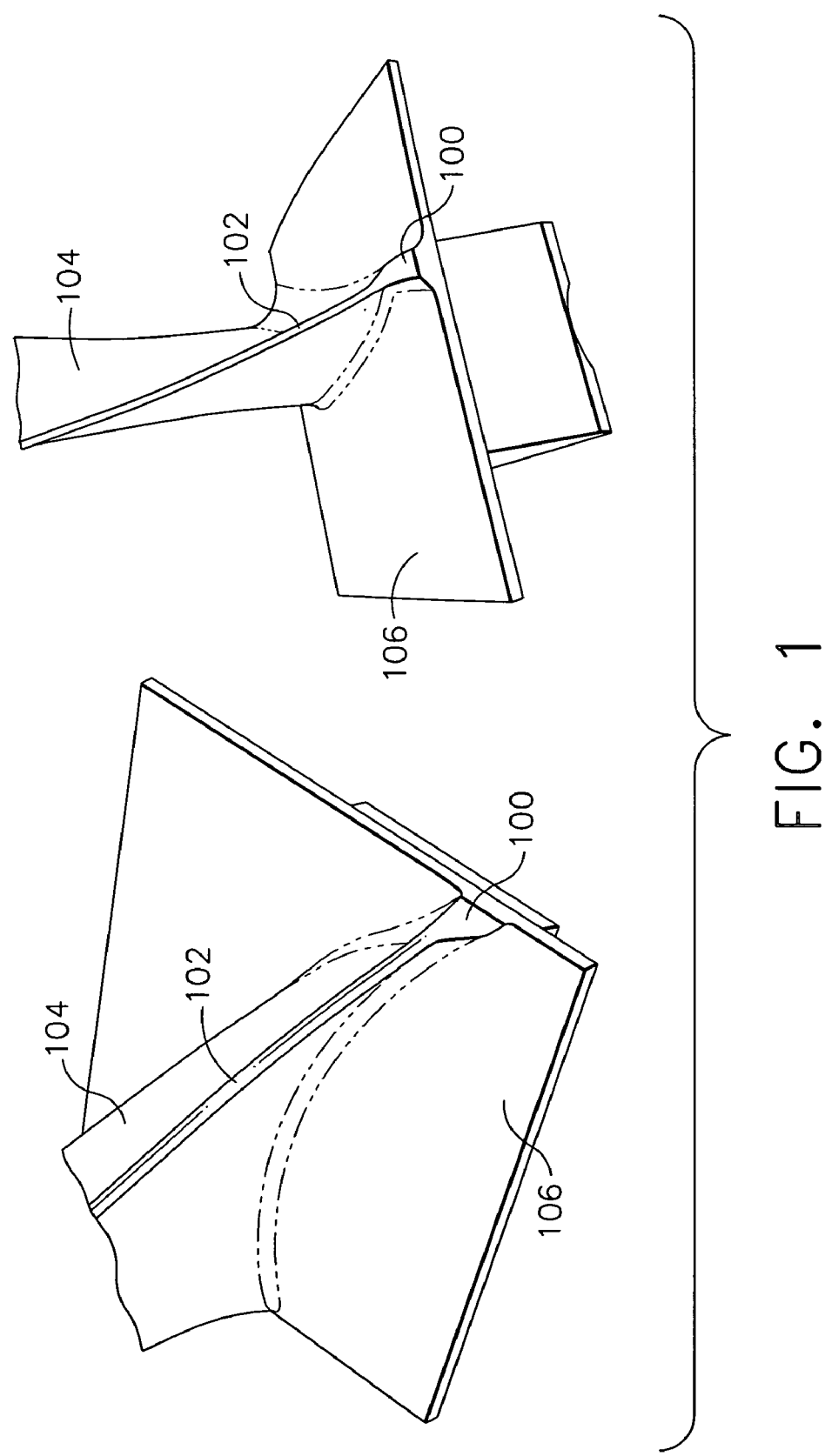
FIG. 1 is a drawing of a partial view of a typical compressor blade from two angles showing excess material from a forging operation.
Figure 2:
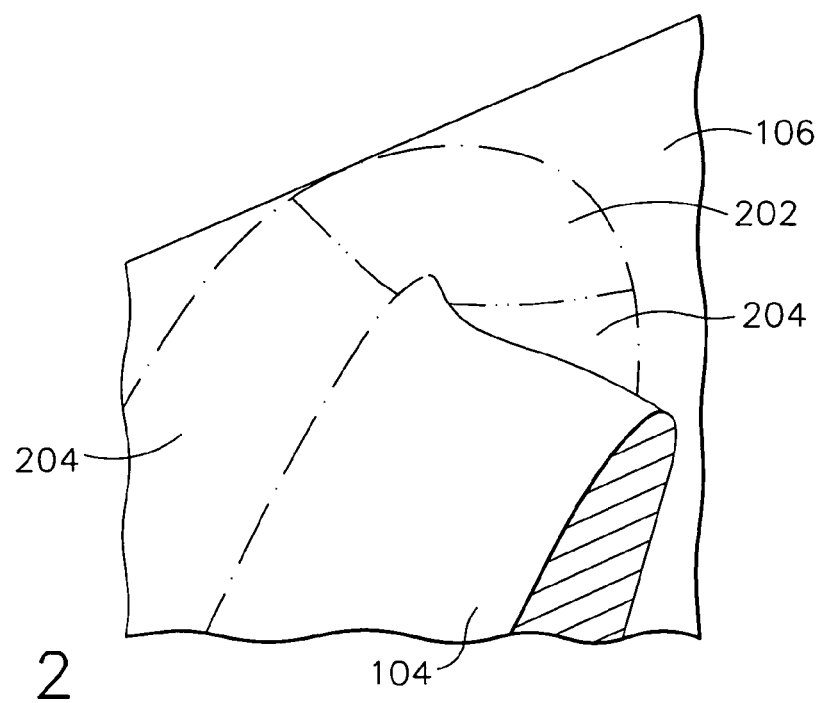
FIG. 2 is a radial view along and showing a portion of the airfoil leading edge of the compressor blade shown in FIG. 1, where an area to be machined to remove excess forging stock is shown.

A typical example of excess material 100 left by a forging operation at the intersection of leading edge 102 of an airfoil 104 and a platform surface 106 is shown in FIG. 1. In some configurations of the present invention and referring to FIG. 2, a drive surface used for the single point milling is created. Surface 202 represents an approximate region that is machined to remove the excess material. Surface 202 is created by trimming fillet surface 204 at 45 and 55% of its chord-wise length, thereby producing surface 202.

Figure 3:
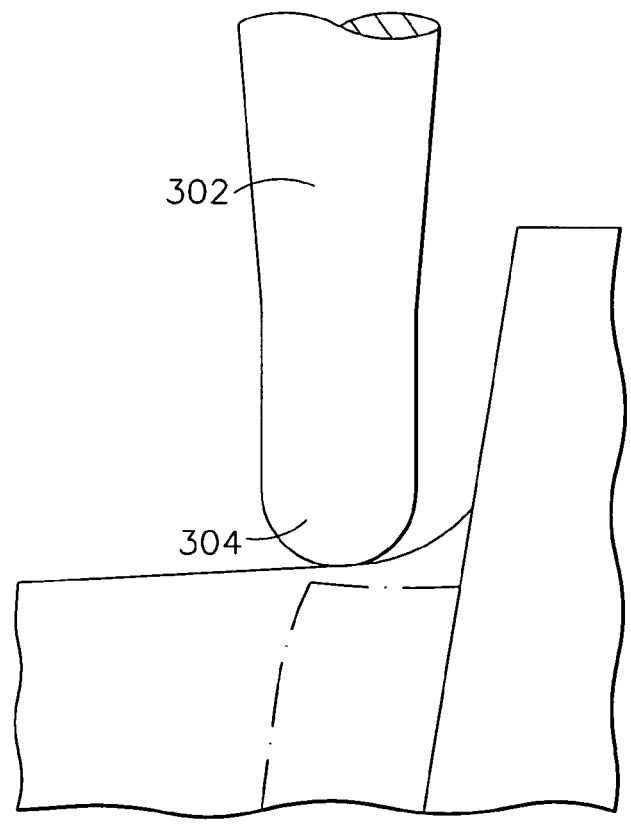
FIG. 3 is a partial side view of blade surfaces of the compressor blade of FIG. 1, showing a tapered ball nose end mill to be used for a milling operation.

FIG. 3 is a side view illustrating blade surfaces. Cylinder 302 represents a tapered ball nose end mill used for the milling operation. Cylinder 302 has a tapered ball nose end mill 304 that is used for the milling operation. In some configurations of the present invention, ball nose end mill has a 0.1 inch (0.254 cm) radius ball geometry that is used to create a 0.125 inch (0.3175 cm) radius fillet. More generally, some configurations of the present invention utilize a ball nose end mill 304 that is between about 15 to 30 percent smaller than the radius size of the fillet to minimize or reduce the number of passes required. Such configurations also advantageously avoid overloading the cutter and reduce cycle time.

Figure 4:
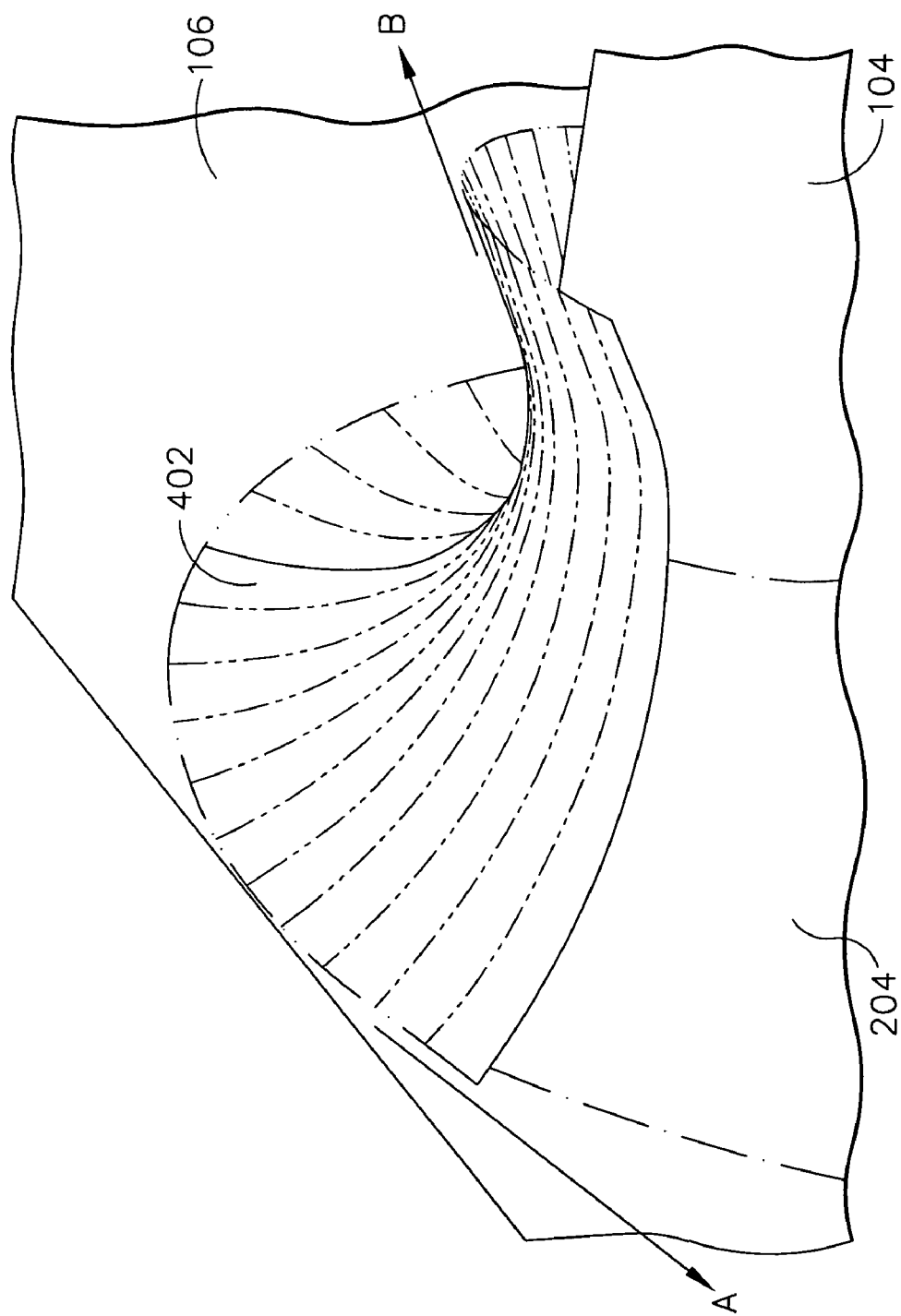
FIG. 4 is an illustration of a drive surface produced when generating a milling tool path, wherein the drive surface is created by offsetting and extending an actual fillet surface.

An offset surface is created from the surface 202. For example, for one particular blade useful for practicing a configuration of the present invention, the offset is 0.008 inch (0.02032 cm). This offset surface is then extended 10 to 20% in directions A and B indicated in FIG. 4. These extensions enlarge the surface linearly. The new surface 402 is the drive surface for a CNC program. By offsetting and extending drive surface 402, configurations of the present invention make it possible to create a tool path that will not undercut airfoil 104, the platform 106, or a forged portion of root fillet 100. This technique also can accommodate natural manufacturing variation produced by the forging operation. Fixtures used in this operation reduce or minimize effects of positional variation, and programming techniques can be used to reduce or minimize the effects of airfoil shape and thickness variation. More particularly, some non-exclusive examples of fixture configurations useful for practicing the present invention are designed to locate parts accurately to reduce or eliminate variation using three points on a platform, with two of the three points located near an area being machined. These three points establish a plane. Two additional points are located on a convex or concave side of the airfoil to orient the airfoil edge and to lock rotation. Another point is on the airfoil edge being machined, to locate the edge being machined. This fixture configuration compensates for variation of the airfoil and the platform of the blades and vanes, and locates the intersection of these surfaces (i.e., the machined area), thereby minimizing variation. Configurations of the present invention that use the fixture configurations described herein along with configurations of tool path generation methods and machining methods described herein advantageously produce acceptable surfaces with no undercuts. Such configurations are also able to acceptably deal with variations in parts resulting from forging processes.

Figure 5:
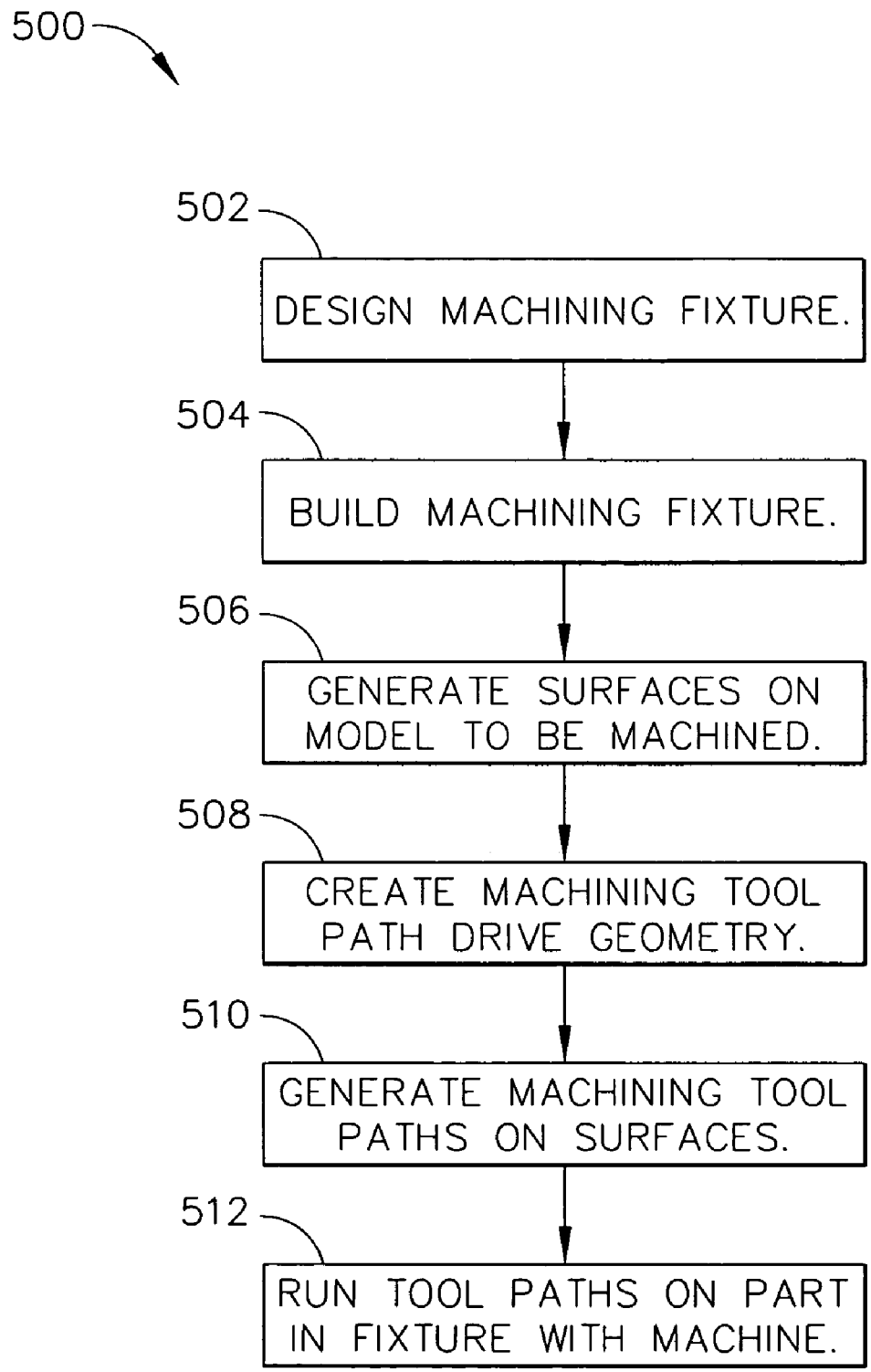
FIG. 5 is a flow chart showing a method representative of various configurations of the present invention.

Thus, in some configurations and referring to flow chart 500 of FIG. 5, a technical effect of the present invention is achieved by defining a machining fixture at 502 and building this fixture at 504 for a part. In some configurations, the part includes airfoil and platform surfaces, and/or the part is produced by forging. A surface or surfaces are generated at 506 on a model to be machined, the surface(s) being drive surface(s) to be used for single point milling. The surface(s) represent an approximate region that is to be machined to remove excess material. The surface or surfaces are created in some configurations by trimming fillet surface(s) at 45 to 55% of their chordwise length. At 508, the machining tool path drive geometry is created or determined. Machining tool paths are generated on surface(s) to be machined at 510, and tool paths are run on the part in the fixture at 512 to finish the part being machined.

As used herein, the terms "trim" and "offset" refer to operations conducted in UNIGRAPHICS® CAD/CAM software that is used commercially for creating CNC programs. (UNIGRAPHICS® is a trademark of UGS PLM Solutions, Inc. of Plano, Tex., and UNIGRAPHICS® CAD/CAM software is available from UGS PLM Solutions Inc., Maryland Heights, Mo.) Although some configurations of the present invention utilize UNIGRAPHICS® CAD/CAM software, it will be understood that this particular brand of CAD/CAM software is cited only by way of non-limiting example. The present invention is not limited to the use of particular brands of software.

Exemplary dimensions are provided above for some configurations of the present invention. The selection of appropriate dimensions for use in other configurations is considered to be a design choice that can be made by one of ordinary skill in the art, after such a person has gained an understanding of the present invention.

It will thus be appreciated that configurations of the present invention provide flexibility in the shape of a machined surface. This, in turn, facilitates a more continuous mating with, for example, an air foil and platform. In general, a true arc is not required at the LE and TE platform fillet. In some configurations, an end mill is used that has a smaller percentage of its periphery cutting at any one time than is the case with root fillet milling, thereby providing an improved surface finish.

While the invention has been described in terms of various specific embodiments, those skilled in the art will recognize that the invention can be practiced with modification within the spirit and scope of the claims.

What is claimed is:

1. A method for finishing a part having excess material, said method comprising:
    generating one or more surfaces on a model of the part to be machined using a computer system, wherein the one or more surfaces represent an approximate region to be machined on the part and an offset surface corresponding to a selected machining tool;
    extending the offset surface generally linearly in at least one direction to create a drive surface;
    creating a machining tool path drive geometry;
    using the machine tool path drive geometry and the drive surface to generate machining tool paths that extend in at least one direction beyond the region to be machined; and
    running tool paths on the part in a fixture.

2. A method in accordance with claim 1 further comprising building a machining fixture for the part to be machined.

3. A method in accordance with claim 1 wherein running tool paths on the part further comprises running tool paths on a part that includes airfoil and platform surfaces.

4. A method in accordance with claim 3 wherein running tool paths on a part that includes airfoil and platform surfaces further comprises running tool paths on airfoil and platform surfaces that are forged surfaces.

5. A method in accordance with claim 1 wherein generating surfaces on a model of the part to be machined includes trimming a fillet surface at between about 45 and about 55 percent of its chordwise length.

6. A method in accordance with claim 5 wherein generating one or more surfaces on a model of the part to be machined further includes generating the offset surface using the trimmed fillet surface.

7. A method in accordance with claim 6 further comprising extending the offset surface between about 10 and about 20 percent to enlarge the offset surface linearly and create a drive surface for a computer numerical control program, wherein the drive surface is based on the offset surface and is used to determine the machining tool paths.

8. A method in accordance with claim 1 wherein running tool paths on the part in a fixture comprises utilizing a tapered ball nose end mill to mill the part.

9. A method in accordance with claim 8 wherein utilizing a tapered ball nose end mill further comprises utilizing a tapered ball nose end mill having a 0.254 cm (0.1 inch) radius and said method further comprises creating a 0.3175 cm (0.125 inch) radius fillet utilizing the tapered ball nose end mill.

10. A method in accordance with claim 8 wherein utilizing a tapered ball nose end mill further comprises utilizing a tapered ball nose end mill having a radius between about 15 and about 30 percent smaller than a radius of a fillet to be machined.

11. A method for finishing a part having excess material, said method comprising:

generating one or more surfaces on a model of the part to be machined using a computer system, wherein the one or more surfaces represent an approximate region to be machined on the part and an offset surface corresponding to a selected machining tool;

extending the offset surface generally linearly in at least one direction to create a drive surface for use by a computer numerical control program;

creating a machining tool path drive geometry;

using the machine tool path drive geometry and the drive surface to create a computer numerical control path for a machining tool, wherein the computer numerical control path extends in at least one direction beyond the approximate region to be machined; and running tool paths on the part in a fixture.

12. A method in accordance with claim 11 wherein running tool paths on the part further comprises running tool paths on a part that includes airfoil and platform surfaces.

13. A method in accordance with claim 11 wherein running tool paths on the part in a fixture comprises single point milling.

14. A method in accordance with claim 11 wherein generating surfaces on a model of the part to be machined includes trimming a fillet surface at between about 45 and about 55 percent of its chordwise length.

15. A method in accordance with claim 14 wherein generating one or more surfaces on a model of the part to be machined further includes generating the offset surface using the trimmed fillet surface.

16. A method in accordance with claim 15 further comprising extending the offset surface between about 10 and about 20 percent to enlarge the offset surface linearly and create a drive surface for a computer numerical control program, wherein the drive surface is based on the offset surface and is used to determine the machining tool paths.

* * * * *